Shickle & Randals,
Water Filter.

N° 62,696. Patented Mar. 5, 1867.

Witnesses:
T. A. Jackson
Wm. Thurm

Inventor:
F. Shickle
E. Randal
Per Munn & Co
Attorneys

United States Patent Office.

FREDERICK SHICKLE AND EVERMONT RANDALS, OF ST. LOUIS, MISSOURI.

*Letters Patent No. 62,696, dated March 5, 1867.*

IMPROVEMENT IN FILTERS.

*The Schedule referred to in these Letters Patent and making part of the same.*

TO ALL WHOM IT MAY CONCERN:

Be it known that we, FREDERICK SHICKLE and EVERMONT RANDALS, of St. Louis, in the county of St. Louis, and State of Missouri, have invented a new and useful Improvement in Water Filters; and we do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to improvements in water filters for filtering and purifying muddy water, and consists of pipes and chambers so connected and arranged that the muddy water shall pass from a receiving-chamber or reservoir through a filtering body of sand, gravel, charcoal, or other suitable porous and purifying compound into a supply-chamber, from which the pure water is drawn off for use by a connected pipe and faucet. The principle upon which the muddy water is filtered and purified is by ascension or passing upward through the filtering compound to the supply-chamber of pure water, and leaving the mud and other impurities at the bottom, instead of by the ordinary process of settling through the filtering compound from the top or sides, and depositing the mud, &c., in or upon the filtering compound. The effect of filtering water upon this principle of ascension is that the filtering compound does not become choked and inoperative, but retains its porous quality, while the deposit of mud and other impurities may be easily removed by a current of water through a waste pipe when necessary. A ball-cock is attached to the filter for connection, when desired, with a water pipe for self-regulating supply.

Figure 2:
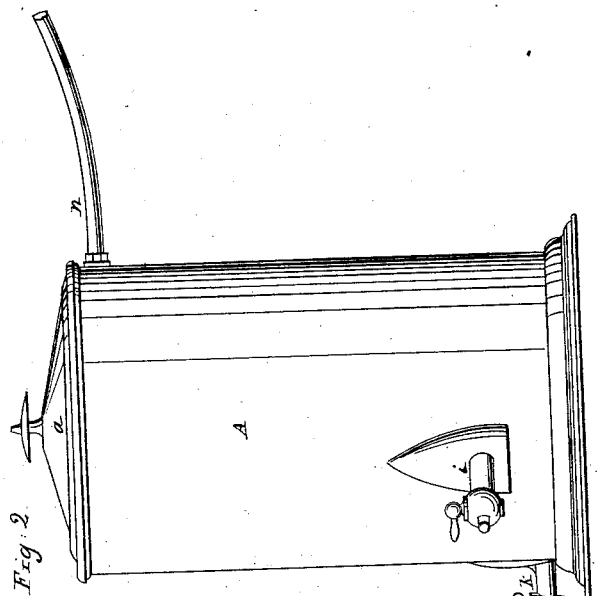
Figure 2 is a perspective view.
Figure 3:
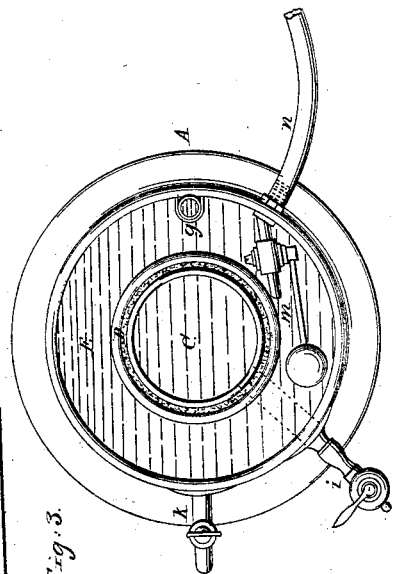
Figure 3 is an inside top view.
Figure 1:
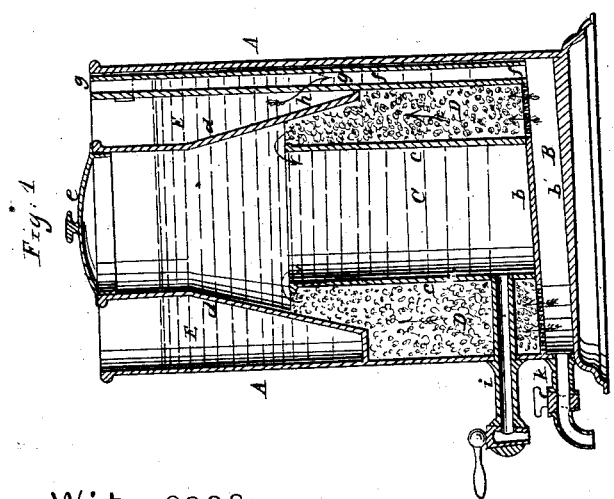
Figure 1 is a vertical central section of the filter.

A is the case or body of the filter, made of sheet-metal or other suitable material, of any size and shape, according to its purpose, but for the use of private families it is made preferably like an ordinary water cooler, as represented, with a cover, $a$. The inside of the filter case A is divided into chambers or compartments by partitions, one of which is the false bottom $b$, placed a few inches, more or less, according to size, above the real bottom $b'$, leaving between them a settling or mud-chamber, B. Resting upon the false bottom $b$, is a central pure-water supply-chamber, C, formed by the partition or wall $c$, which extends half way or more up the body of the filter, and is open at the top, leaving an annular filtering-chamber D between it and the case A. The upper part of the chamber C is surrounded by a partition wall, $d\,d$, which is joined at the lower part to the case A, and extends to the top where it is open, forming a kind of truncated cone in the middle of the filter, leaving an annular space or receiving-chamber, E, between it and the case A. The top may be provided with a cover, $e$. A tube, $f\,f$, passes from the bottom of the chamber E on the inside of the case to the chamber B at the bottom. Fitted into the upper end of the pipe $f\,f$, is a movable air-tube, $g\,g$, which runs down from the top. Near the lower end is made a small hole, $h$, in the side of tube, for the admission of water, as indicated by the arrow, fig. 1. The annular chamber D is the filtering-chamber, and is filled with the compound of gravel and sand or other materials used for the purpose. The false bottom $b$ is perforated with small holes under the chamber D. A draw pipe, $i$, with a faucet attached, runs from the central chamber C to the outside of the filter-case A, and a waste pipe, $k$, with a faucet, leads from the mud-chamber B. In the upper part of the filter is placed an ordinary ball-cock, $m$, for self-supply, when desired, connected with a water pipe, $n$, fig. 3. The water is first introduced into the annular chamber E, and passes through the hole $h$ in the air pipe $g$, down through the pipe $f$ to the chamber B, whence it ascends through the holes in the false bottom $b$ into the filtering-chamber D, and, percolating upward through the filtering compound, rises to the supply level and fills the chamber C, and the open space above, inside of the conical walls $d\,d$, with pure water, as shown in fig. 1, which is drawn off through the pipe $i$. More or less muddy deposit will constantly form at the bottom of the chamber E, which may be removed daily, or as often as required, by lifting the loose tube $g$, and allowing it to run down the pipe $f$, and when mud accumulates in the chamber B it is readily cleaned out by opening the waste pipe $k$. The bottom $b'$ is made a little shelving toward the outlet to clean it more thoroughly.

Having thus described the construction and operation of our invention, what we claim as new, and desire to secure by Letters Patent, is—

The water filter, consisting of the annular receiving-chamber E, filtering-chamber D, supply-chamber C, surrounded at its upper part by the partition wall $d\ d$, tube $ff$, air-tube $g$, and mud-chamber B, when constructed and arranged as herein set forth for the purpose specified.

FRED'K SHICKLE,
EVERMONT RANDALS.

Witnesses:
 THOS. STEARNS,
 EDMUND F. SCHREMM.